Feb. 9, 1943.         J. R. FERGUSON         2,310,410
                       MOTOR VEHICLE
                     Filed Feb. 6, 1941
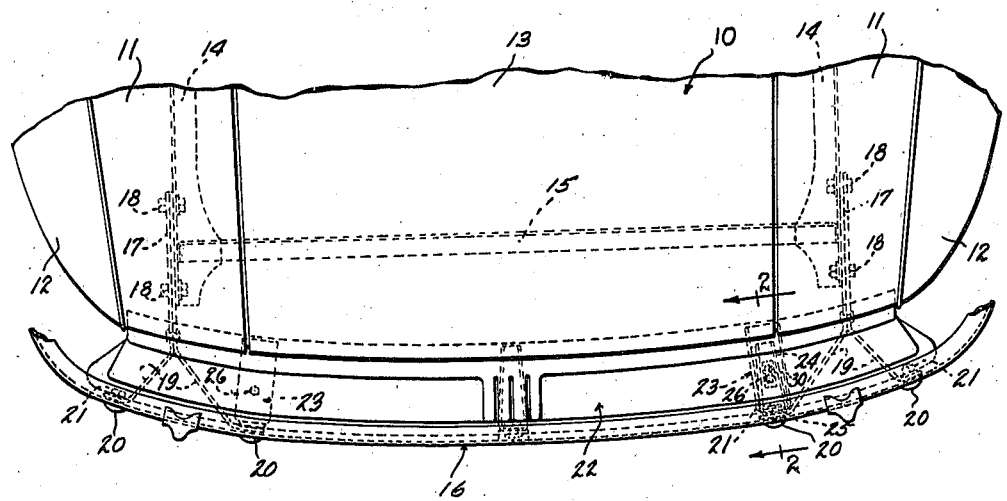
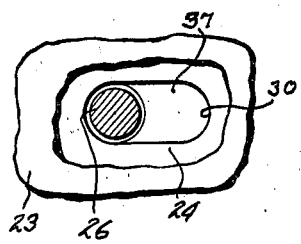
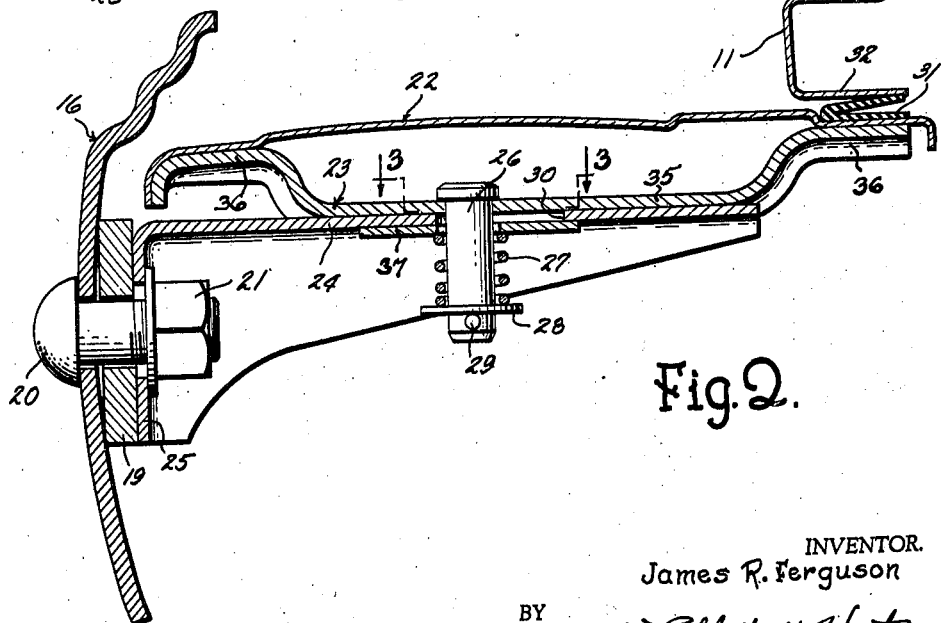
INVENTOR.
James R. Ferguson
BY
Tibbetts & Hart
Attorneys Patented Feb. 9, 1943

2,310,410

UNITED STATES PATENT OFFICE 2,310,410

MOTOR VEHICLE

James R. Ferguson, Royal Oak, Mich., assignor to Packard Motor Car Company, Detroit, Mich., a corporation of Michigan Application February 6, 1941, Serial No. 377,692

3 Claims. (Cl. 293—55)

This invention relates to motor vehicles and more particularly to deflectors for protecting the vehicle body from stones and other objects on the road thrown by the wheels.

Deflectors are usually arranged to extend across the space between the body and the transverse impact bar of a bumper structure of motor vehicles so that stones and other loose objects will not be thrown against the body by the wheels. It is customary to fix the bumper structure rigidly with the vehicle frame and to fix the deflector to the bumper structure. Weaving and twisting of the vehicle frame will impart similar motion to the bumper structure and the deflector will likewise respond to such movement. Such bending of the deflector and movement of the bumper structure from an external source will permanently injure the deflector or mar its finish.

An object of this invention is to provide a securement for a motor vehicle deflector that will reduce the above mentioned disadvantages.

Another object of the invention is to provide a motor vehicle deflector mounting that will allow a limited weaving movement of the vehicle frame without distortion of the deflector.

Another object of the invention is to anchor a motor vehicle deflector on a bumper structure fixed to the vehicle frame so that it will be unaffected by impact blows and bending movements of the frame.

Other objects of the invention will appear from the following description taken in connection with the drawing, which forms a part of this specification, and in which:

Fig. 1 is a plan view of the rear end of a motor vehicle showing the deflector associated with the body carrying frame and bumper;

Fig. 2 is a sectional view taken on line 2—2 of Fig. 1;

Fig. 3 is a sectional view taken substantially on line 3—3 of Fig. 2, showing the relation of a deflector anchor pin with its supporting bracket.

The rear end of a conventional motor vehicle body 10 is illustrated in the drawing. The rear panel 11 has side fenders 12 fixed thereto and a storage compartment opening is closed by a lid 13. The body is fixed on a conventional frame of which the side members 14 and rear transverse member 15 are shown.

A conventional type of bumper is fixed to and projects rearwardly of the frame. A transversely extending impact bar 16 is carried by a pair of similar Y-shaped supporting structures each comprising a pair of bars having base portions 17 secured to the rear end of a frame side sill by bolts 18, diverging arm portions 19 having laterally extending ends secured to the impact bar by bolts 20 and nuts 21. The impact bar and supporting structures form a rigid unit with the vehicle frame and thus the deflections or weaving movements of the frame are transmitted to the bumper.

A deflector bridges the space between the rear end of the body and the impact bar of the bumper and consists of a sheet structure 22 and a pair of carrier members 23. The carrier members are spaced transversely of the vehicle and are formed with a base portion 35 having upstanding end portions 36 to which the sheet structure 22 is welded or otherwise rigidly secured. The rear body panel has a forwardly bent bottom flange 32 beneath which the forward end of the deflector extends and a V-shaped resilient gasket 31 engages the adjacent surfaces of flange 32 and the deflector thereunder. If desired, this gasket may be vulcanized or otherwise secured to the deflector.

It is proposed to support the deflector so that it will not become injured or marred by the usual bending or weaving of the vehicle frame or by lesser impacts upon the bumper. The deflector is carried by the bumper and is mounted so that there can be relative movement in substantially any direction. A pair of similar brackets 24 supports the deflector and each bracket has a rear leg 25 that is secured against the rear flanged end of one of the bumper supporting arms 19 by the securing means 20.

The flat bases 35 of the deflector carriers are seated on the brackets 24 and are held thereagainst by anchor means in the form of headed pins 26. The carrier bases 35 each have an opening therethrough and the brackets 24 are each formed with a longitudinally extending slot 30 of greater width than the diameter of pins 26 and considerably longer than the pin diameter. The pins extend through such registered openings and slots with their heads bearing against the carriers. A pair of washers 37 and 28 encircle each pin below the brackets and is so maintained by a retainer pin 29. Resilient means in the form of a coil spring 27 encircles each pin 26 between the washers and urges the pin downwardly to seat the deflector carriers against the brackets.

The pins 26 have a relatively close but vertically sliding fit in the openings in the deflector carriers so that the supporting brackets can rock a limited extent in any direction relative thereto, the size of the slots 30 allowing such movement of the brackets. The deflector thus has a two-point anchorage on the bumper structure so that weaving or twisting movements of the vehicle frame will not be transmitted thereto, and the impact bar can move fore and aft a limited extent relative to the deflector without crumpling or distorting the deflector. The length of the slots 30 also allows some latitude in the longitudinal location of the deflector in the initial assembly upon the supporting brackets.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle, the combination with a body carrying frame and a bumper secured to and having a transversely extending impact bar spaced beyond one end of the body, a pair of spaced brackets fixed to the impact bar and extending toward the body, a carrier member seated on each bracket, a sheet stone deflector fixed to the carrier members and extending across the space between the body and the impact bar, and means loosely anchoring said carrier members to the brackets whereby the frame and bumper can move relatively a limited extent in any direction without distorting the stone deflector.

2. In a vehicle, the combination with a body carrying frame and a bumper secured to and having a transversely extending impact bar spaced beyond one end of the body, a pair of spaced brackets fixed to the impact bar and extending toward the body, a carrier member seated on each bracket, said carrier members having upstanding ends, a sheet stone deflector fixed on the upstanding ends of said carrier members and extending across the space between said body and said impact bar, and means loosely securing the carrier members to the brackets.

3. In a vehicle, the combination with a body carrying frame and a bumper secured to and having a transversely extending impact bar spaced beyond one end of the body, a pair of spaced brackets fixed to the impact bar and extending toward the body, a carrier member seated on each bracket, means loosely anchoring said carrier members to the brackets, a stone deflector fixed to the carrier members and extending across the space between the end of the body and the impact bar, and spring means acting on said securing means to hold said carrier members in contact with said brackets.

JAMES R. FERGUSON.